Dec. 13, 1938.   G. M. FARABOUGH   2,140,075
CUTTING UTENSIL
Filed Sept. 3, 1936
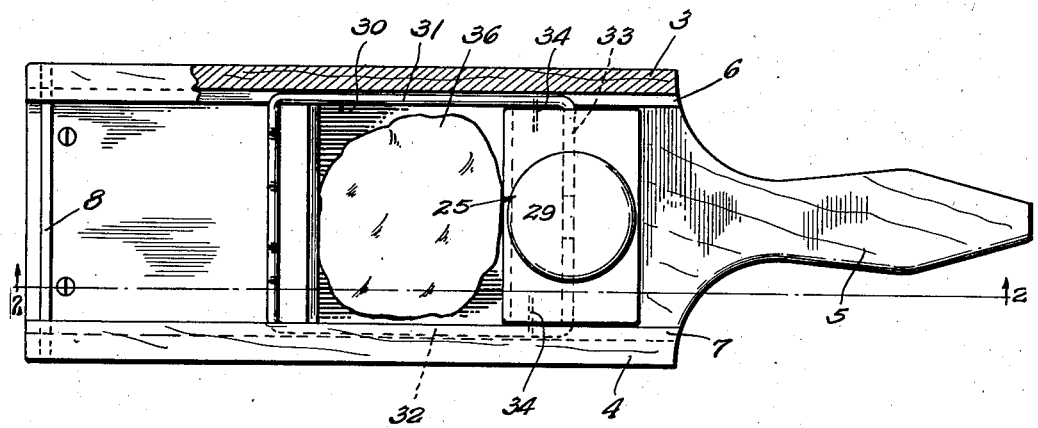
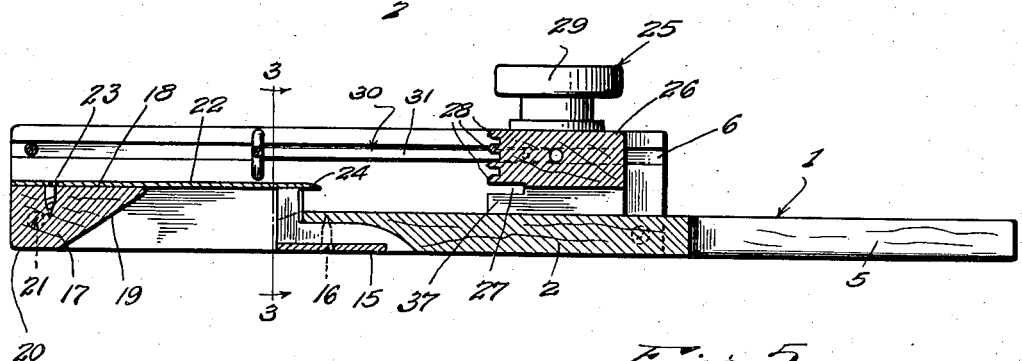
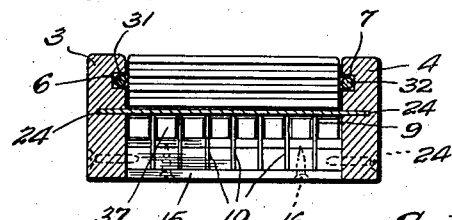
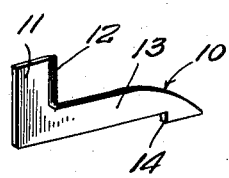
Inventor
G. M. Farabough.

Patented Dec. 13, 1938

2,140,075

UNITED STATES PATENT OFFICE 2,140,075

CUTTING UTENSIL

George M. Farabough, Rogers, Ark.

Application September 3, 1936, Serial No. 99,301

1 Claim. (Cl. 146—168)

This invention relates to an improved cutting utensil and, more particularly, to a device for cutting potatoes and other vegetables, as well as different kinds of fruit, into strips.

One object of the invention is to provide a cutting utensil which will permit the ready cutting of potatoes in a highly efficient manner and which may be handled with the greatest of ease.

Another object of the invention is to provide a cutting utensil which will be light in weight and cheap to manufacture, so that it may be retailed at an attractive figure.

A further object of the invention is to provide a device of this character employing a body wherein is positioned the cutter blade and a plurality of cutting elements which cooperate with a movable plunger for slicing the vegetables.

A still further object of the invention is to provide a cutting utensil, the plunger of which is fitted with a guide for controlling the direction of travel of the plunger and the length of such travel in a forward direction, said guide acting as a retriever for returning a potato or other vegetable, after a cutting operation, to a position in front of the cutter blade and cutting elements for a further cutting operation.

Other and incidental objects of the invention will render themselves apparent during the course of the following description.

In the drawing forming a part of my application:

Figure 1 is a top plan view, partly broken away, and shown in section, illustrating my device ready for use with a vegetable in position for a slicing operation.

Figure 2 is a longitudinal sectional view on the line 2—2 of Figure 1, looking in the direction indicated by the arrows.

Figure 3 is a vertical sectional view on the line 3—3 of Figure 2, looking in the direction indicated by the arrows.

Figure 4 is a detail perspective view of one of the cutting elements employed.

Figure 5 is a fragmentary detail perspective view of the end portion of the retriever carried on the guide employed.

Referring now more particularly to the drawing, wherein like numerals of reference will be seen to designate like parts throughout the several views, the numeral 1 indicates in general a body which is provided with a bottom wall 2 and side flanges 3 and 4. The side flanges 3 and 4 extend throughout the major portion of the length of the body 1 and, as will be seen clearly in Figures 1 and 2 of the drawing, the body is reduced at one end to define a handle 5 which is adapted for convenient manual engagement. The body 1 may be formed of wood or other suitable material. Formed in the side flanges 3 and 4 and extending throughout their entire length are oppositely disposed guide slots 6 and 7. Extending through the side flanges 3 and 4 at the end of the body opposite the handle 5 and through the slots 6 and 7, is a stop rod 8. The stop rod is upset at its end portions so that it will be firmly locked in place.

The bottom wall 2 is provided at its inner end portion with a series of longitudinally extending spaced kerfs or slots 9 which are adapted to receive a plurality of cutting elements 10. I have shown seven of the cutting elements in place but it should be understood that any desired number may be employed. The cutting elements are identical in construction and, therefore, a description of one will suffice for all. A typical cutting element includes an upstanding cutter 11 having a beveled sharpened cutting edge 12. The upstanding cutter is provided with a laterally extending shank 13 which is rounded near its free end. The shank is undercut to define a shoulder 14 near its free end. As best seen in Figure 2 of the drawing, the bottom wall 2 is cut away near its inner end throughout its entire width for a distance of substantially one-fourth its length, exclusive of the handle. The cutting elements are positioned in the slots 9 with their cutters 11 arranged in a row with the beveled edges thereof pointing in the direction of the handle 5. The cutting elements are retained in position by a locking plate 15 which fits in the cut away portion of the wall 2 and engages behind the shoulders of the cutting elements. Screws 16 retain the plate in a position flush with the surface of the bottom wall 2. It will be seen that the cutting elements will be firmly retained in position and will be locked on the bottom wall against movement in either direction.

Mounted on the body 1, at the end thereof opposite the handle 5, is a mounting plate 17 which is provided with a flat upper surface 18 and a beveled deflecting surface 19. The mounting plate 17 has a lower surface 20 which is adapted to lie in the same horizontal plane with the lower surface of the bottom wall 2. The mounting plate is held in position by means of screws 21 which extend through the side walls of the flanges 3 and 4. A cutter blade 22 has its outer end portion secured to the mounting plate 17 by means of screws 23. The longitudinal edges of the cutter blade 22 are positioned in alined relatively narrow slots 24 formed in the side flanges 3 and 4. It will be seen that the cutter blade 22 will be limited against upward and downward movement by the relatively narrow slots 24 and will be limited against withdrawal in either direction by the screws 23. The height of the mounting plate 17 is substantially equal to the height of the cutting elements 10, in operative position, so that the blade 22 will be mounted for positioning its free or cutting end portion in overlying relation to the corresponding upper ends of the cutters 11 of the cutting elements 10. The cutter blade 22 has a cutting edge 24 which is disposed slightly forwardly of the cutting edges 12 of the cutters 11. If desired, the cutting edges 24 and 12 may meet at right angles to each other at their corresponding forward ends. It is further desired to point out that the cutter blade 22 is disposed substantially medially of the height of the body and extends throughout substantially half the length of the body 1, exclusive of the handle 5.

In order to complete the cutting or slicing of a potato or other vegetable or fruit, I employ a plunger 25 which includes a block 26 having a lateral slot 27 in its front face adapted to receive the edge 24 of the cutter blade 22. Serrations 28 are formed on said forward face to permit ready engagement of the block with the vegetable or furit to be sliced. A handle 29 is fitted to the top of the block for permitting ready manual engagement thereof. The block 26 of the plunger is rectangular in shape and is adapted to fit snugly but slidably between the flanges 3 and 4 of the body 1, with its lower surface in engagement with the top surface of the bottom wall 2.

The movement of the block 26 of the plunger 25 is controlled by means of a substantially rectangular guide 30 which is formed of heavy wire and is provided with legs 31 and 32 which slide longitudinally but snugly within the slots 6 and 7. The legs terminate at their free ends in laterally directed anchoring pins 33 which extend from opposite sides of the block 26, medially of its width, inwardly to terminate in closed opposed spaced relation. While the legs 31 and 32 of the guide 30 will be effectually retained in place on the block 26 while said block is in normal position between the flanges 3 and 4, I provide brads or nails 34 which are passed through the legs 31 and 32 in close proximity to the anchoring pins 33 and are sunk into the material of the block. The guide 30 will thus be effectually retained in operative position on the plunger 25. Furthermore, the brads 34 will cooperate with the pins 33 for retaining the guide in proper position with respect to the plunger 25. The forward end of the guide 30 is formed to provide a zig-zag shaped retriever 35. As best seen in Figures 2 and 5, the bent portions defining the retriever are vertically disposed so that said retriever will provide additional surface to engage a portion of the vegetable being sliced so that it may be readily brought back for a further cutting operation. Danger of jumping of the vegetable or fruit over the retriever, which would be present were it not for the zig-zag formation, will be eliminated.

As will be observed, the slots 6 and 7 are open at their inner ends so that the plunger and guide may be drawn rearwardly through said open ends of the slots and freed from the body when it is desired to remove the plunger for cleaning or any other purpose.

In use, when it is desired to slice a potato such as shown at 36, for instance, or any other fruit or vegetable, said article is first placed on the upper surface of the bottom wall 2, it being understood that the plunger 25 is first retracted for freeing said upper surface of the bottom wall 2. The plunger is then manually engaged and moved forwardly for forcing the potato or other article between the serrations 28 of the block 26 and the cutting edge 24 of the cutter blade 22 and the cutters 11 of the cutting elements 10. The article is sliced horizontally by the cutter 24 and the lower portion of said article is sliced into longitudinal strips by the cutting edges 12 of the cutters 11. The deflecting surface 19 of the mounting plate 17 will serve to direct the cut strips downwardly into a pan or other container which may be conveniently placed beneath the device. The upper portion of the article is moved along the upper surface of the blade 22 while the lower surface is being cut into strips. The guide 30 will effectually control the movement of the plunger and the stop rod 8 will engage the retriever 35 and will limit forward movement of the guide and plunger. After the lower portion of the vegetable has been cut into strips and it is desired to continue the cutting operation, it is only necessary to retract the plunger 25, which will, of course, retract the guide and the retriever so that said retriever will return the uncut portion of the vegetable to a position overlying the upper surface of the bottom wall 2. The cutting operation is repeated and this operation may be continued until the entire vegetable has been sliced as desired.

Attention is directed to the fact that the block 26, below the lateral slot 27, is provided with vertical slots 37 which will define projections adapted to extend between the cutting elements 10 for effecting ready cleaning thereof and preventing the adherence thereto of any portion of the cut vegetable between said cutting elements.

It is believed that from the foregoing it will be readily understood that I have provided a simple and highly efficient cutting utensil which may be manufactured with ease and cheapness and which will be useful as a household article.

Having thus described the invention, what I claim is:

In a cutting utensil, a body having a bottom wall formed with a handle, side flanges carried by the body, said bottom wall being cut away at the end opposite the handle and being formed with slots, cutting elements carried by the bottom wall and positioned in said slots, said cutting elements being arranged vertically in a laterally spaced series and being formed with shoulders, a locking plate carried in the cut away portion and adapted to engage the shoulders for retaining the cutting elements in place, a mounting plate carried by the body, a cutter blade carried by the mounting plate and adapted to extend within the body, said cutter blade having a cutting edge overhanging the cutting elements, a plunger carried by the body and movable longitudinally between the side flanges, said plunger having a block formed with a serrated face, said serrations being of V-shape, a guide carried by the plunger and formed with a zig zag retriever, said guide being adapted to control forward movement of the plunger in the body, and a stop rod for limiting forward movement of said guide and plunger, said plunger being movable for engaging the V-shaped serrations of the block with a vegetable to be cut and forcing said vegetable against the cutting elements and the blade whereby a cutting operation will be effected, said V-shaped serrations being effective for engaging the vegetable and preventing slipping thereof at engagement with the plunger, said V-shaped serrations permitting ready disengagement of the vegetable cuttings from the plunger face after a cutting operation.

GEORGE M. FARABOUGH.